United States Patent
Weigand

(10) Patent No.: US 12,264,683 B2
(45) Date of Patent: Apr. 1, 2025

(54) METHOD FOR CONTROLLING AN ELECTRICALLY SUPPORTED EXHAUST GAS TURBOCHARGER

(71) Applicant: Robert Bosch GmbH, Stuttgart (DE)

(72) Inventor: Rainer Weigand, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 117 days.

(21) Appl. No.: 17/038,487

(22) Filed: Sep. 30, 2020

(65) Prior Publication Data

US 2021/0102545 A1    Apr. 8, 2021

(30) Foreign Application Priority Data

Oct. 7, 2019  (DE) .................. 102019215310.0

(51) Int. Cl.
| | |
|---|---|
| F04D 27/00 | (2006.01) |
| F02B 37/18 | (2006.01) |
| F02B 37/24 | (2006.01) |
| F02D 23/00 | (2006.01) |
| F04D 25/06 | (2006.01) |

(52) U.S. Cl.
CPC ........... *F04D 27/002* (2013.01); *F02B 37/18* (2013.01); *F02B 37/24* (2013.01); *F02D 23/00* (2013.01); *F04D 25/06* (2013.01); *F04D 27/004* (2013.01); *F05D 2220/40* (2013.01); *F05D 2270/62* (2013.01)

(58) Field of Classification Search
CPC ...... F04D 25/045; F04D 25/06; F04D 27/002; F04D 27/004; F02B 37/22–24; F02D 23/00; F05D 2220/40; F05D 2270/62

USPC ........ 60/505.1, 602, 607, 608, 615; 123/565
See application file for complete search history.

(56) References Cited

U.S. PATENT DOCUMENTS

| | | | |
|---|---|---|---|
| 7,478,533 B2 * | 1/2009 | Ueno | F02B 39/10 |
| | | | 60/602 |
| 2007/0062191 A1 * | 3/2007 | Furman | F02D 41/0007 |
| | | | 60/605.1 |
| 2014/0298821 A1 | 10/2014 | Yamasaki et al. | |

FOREIGN PATENT DOCUMENTS

| | | |
|---|---|---|
| CN | 105649758 A | 6/2016 |
| CN | 105927370 A | 9/2016 |
| DE | 10302453 A1 | 8/2003 |
| DE | 102015216261 A1 | 3/2017 |

* cited by examiner

*Primary Examiner* — Alexander B Comley
(74) *Attorney, Agent, or Firm* — NORTON ROSE FULBRIGHT US LLP; Gerard A. Messina

(57) ABSTRACT

A method for controlling an electrically supported exhaust gas turbocharger. A planned effective turbine area is ascertained in an observing path for the electrically supported exhaust gas turbocharger and an observed effective turbine area is ascertained in a planned controlling path. A correction signal for the electrically supported exhaust gas turbocharger is ascertained as a function of the difference between the planned effective turbine area and the observed effective turbine area and an actuator being controlled as a function of the planned effective turbine area and/or the electric machine being activated for controlling the electrically supported exhaust gas turbocharger.

10 Claims, 3 Drawing Sheets

METHOD FOR CONTROLLING AN ELECTRICALLY SUPPORTED EXHAUST GAS TURBOCHARGER

CROSS REFERENCE

The present application claims the benefit under 35 U.S.C. § 119 of German Patent Application No. DE 102019215310.0 filed on Oct. 7, 2019, which is expressly incorporated herein by reference in its entirety.

BACKGROUND INFORMATION

The related art is an electronic supercharging pressure control unit for single- and two-stage exhaust gas turbochargers. The supercharging pressure of an exhaust gas turbocharger is tracked to a supercharging pressure setpoint value with the aid of a controller. The supercharging pressure is controlled via a bypass to the turbine (waste gate) or with the aid of a variable turbine geometry.

German Patent Application No. DE 103 02 453 A1 describes a method and a device for controlling the supercharging pressure of an exhaust gas turbocharger 1, in which a supercharging pressure actual value (pvdkds) is tracked to a supercharging pressure setpoint value (plsoll). Here, the supercharging pressure of the exhaust gas turbocharger 1 is controlled as a function of a characteristic variable of an auxiliary compressor 5 cooperating with the exhaust gas turbocharger 1 to compress the air taken in. In this way, unnecessary opening of a bypass valve of the exhaust gas turbocharger 1 is avoided.

Furthermore, the combination of a single-stage exhaust gas turbocharging operation using an auxiliary electric compressor connected in series, is conventional.

SUMMARY

In a first aspect of the present invention, a method for controlling an electrically supported exhaust gas turbocharger is provided. In accordance with an example embodiment of the present invention, a planned effective turbine area is ascertained in an observing (monitoring) path for the electrically supported exhaust gas turbocharger and an observed effective turbine area is ascertained in a planned controlling path, a correction signal for the electrically supported exhaust gas turbocharger being ascertained as a function of the difference between the planned effective turbine area and the observed effective turbine area, and an actuator being activated as a function of the planned effective turbine area and/or the electric machine being activated for controlling the electrically supported exhaust gas turbocharger.

The above-described example method provides for a control of an electrically supported exhaust gas turbocharger, in which an electrically supporting and/or recuperative operation of the electrically supported exhaust gas turbocharger is taken into consideration, when controlling the supercharging pressure, by observing the component protection limit of the charger rotational speed, the avoidance of pumping, the maximum exhaust gas back pressure, and the maximum temperature downstream from the compressor. The exhaust gas turbocharger and the support by the electric machine are modelled as one component through the physical description of the operative connections. The control uses the additional dynamic through the electrical support as well as the determination of the maximally possible recuperative power in the particular operating state.

With the aid of the method, a particularly efficient operation of the electrically supported exhaust gas turbocharger is provided.

This advantage results from the fact that the portion of the electric machine is determined to be the portion of the mechanical turbine power from the strategy of requesting the electrical support only if the exhaust gas turbocharger is not capable of establishing the desirable dynamic of the change in the setpoint supercharging pressure, taking into consideration the component protection and physical limits.

Furthermore, a correction of the observing path and of the planned controlling path may be carried out as a function of the difference between an instantaneously ascertained rotational speed and a modelled rotational speed of the electrically supported exhaust gas turbocharger. This increases the robustness and accuracy of the control in the case of active electrical support.

Furthermore, a maximally possible rotational speed gradient may be ascertained as a function of the maximally effective area and/or the exhaust gas temperature and/or the exhaust gas mass flow and by including the maximally available electrical power of the electric machine. In this way, the maximally possible dynamic is known by observing the component protection limits on the turbine end without further calibration efforts.

In particular, the maximally possible power of the exhaust gas turbine may be ascertained as a function of a minimal turbine area and/or the exhaust gas back pressure and/or the exhaust gas mass flow. By restricting the exhaust gas back pressure, it is possible to reduce the fuel consumption of the internal combustion engine if the lacking driving power may be provided to the turbine with the aid of electrical support.

It may be provided that planned turbine power is restricted to a maximally possible turbine power. Therefore, component protection limits and thus potential damage to the electrically supported exhaust gas turbocharger may be prevented.

It may be furthermore provided that a waste gate valve and/or a variable turbine geometry of the electrically supported exhaust gas turbocharger is/are used as the actuator.

It is advantageous that if a gradient of the setpoint rotational speed exceeds a maximally possible rotational speed gradient, in particular if the gradient of the setpoint rotational speed exceeds the maximally possible rotational speed gradient by at least 10%, a supporting operation of the electric machine is carried out for the electrically supported exhaust gas turbocharger and the turbine actuator is set to the minimal turbine area. This is advantageous, since as a result of the gradient being exceeded, it is switched directly to an electrically supporting, in particular electrically maximally supporting, operation for the electrically supported exhaust gas turbocharger. This has the particular advantage that it makes it possible to quickly respond to a power request of the electrically supported exhaust gas turbocharger without the need to run through the entire controller structure.

Furthermore, if the gradient of the setpoint rotational speed exceeds the maximally possible rotational speed gradient, a signal is transmitted from the engine control unit to the control unit of the electrically supported exhaust gas turbocharger and the control unit requests in a coordinator an electrically supporting operation, in particular a maximally electrically supporting operation, for the electrically supported exhaust gas turbocharger. This has the particular advantage that it makes it possible to quickly respond to a power request of the electrically supported exhaust gas turbocharger without the need to run through the entire controller structure.

In particular, a supporting operation of the electrically supported exhaust gas turbocharger may be requested, if the planned turbine power exceeds the maximally possible turbine power.

Furthermore, a power difference between the planned turbine power and the restricted power may be used as a precontrol value for the electrically supported exhaust gas turbocharger. This is advantageous, since the system may thus be quickly adjusted.

Furthermore, a difference between the maximally possible turbine power and the planned compressor power corresponds to a maximally possible recuperative power. In this way, it is possible to ascertain in a simple manner, how much excess energy is available to the system for a recuperative process, it still being possible to comply with the driver's intention.

Furthermore, it is possible to carry out the maximally possible recuperative power completely or only partially as a function of a weighting factor, in particular a weighting factor of 85%, and/or as a function of a component protection function, in particular a pumping avoidance of the electrically supported exhaust gas turbocharger or a gear change of the motor vehicle and/or as a function of a battery state of the motor vehicle. This is advantageous, since it may be decided by the used system with regard to the limits, whether energy can or should be recuperated.

In further aspects, the present invention provides a device, in particular a control unit, and a computer program that are configured, in particular programmed, to carry out one of the methods. In a still further aspect, the present invention provides a machine-readable memory medium, on which the computer program is stored.

BRIEF DESCRIPTION OF THE DRAWINGS

The present invention is described in greater detail hereinafter with reference to the figures and based on exemplary embodiments.

DETAILED DESCRIPTION OF EXAMPLE EMBODIMENTS

Figure 1:
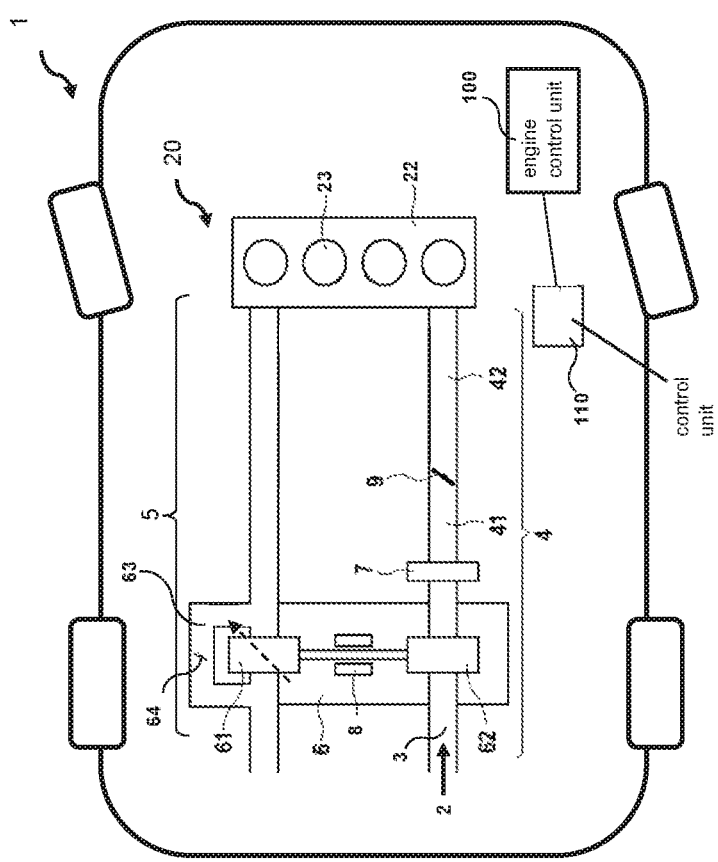
FIG. 1 shows a schematic representation of a vehicle 1 including an internal combustion engine 22.

FIG. 1 shows a motor vehicle 1 including an internal combustion engine system 20 and an internal combustion engine 22 having a number of cylinders 23. The present exemplary embodiment shows a four-cylinder internal combustion engine 22 without limitation. Internal combustion engine 22 may be designed as a diesel or a gasoline engine.

In a conventional manner, internal combustion engine 22 is supplied with ambient air via an air supply system 4 and the combustion exhaust gas is discharged from cylinders 23 via an exhaust gas system 5. Air supply system 4 is connected to cylinders 23 of internal combustion engine 22 via inlet valves (not shown) in a conventional manner. The combustion exhaust gas is ejected into exhaust gas system 5 via corresponding outlet valves (not shown) in a conventional manner.

In the flow direction of air 2, the following is situated: A first sensor 3, for example a hot-film air flow meter (HFM) 3, a supercharging device 6, including an exhaust gas turbine 61 in exhaust gas system 5, and a compressor 62 in air supply system 4.

First sensor 3 may determine a pressure $p_1$, a temperature $T_1$, and a mass flow $\dot{m}_{cmpr}$. Alternatively or additionally, it is also possible to install a sensor for every system variable. The measured variables that are computed on control unit 100 may also be ascertained with the aid of models. Supercharging device 6 is designed as an electrically supported exhaust gas turbocharger 6. Turbine 61 is mechanically coupled to compressor 62, so that the exhaust gas enthalpy, which is converted to mechanical energy in turbine 61, is used to compress the ambient air taken from the surroundings in compressor 62.

In addition, the supercharging device may be electrically operated with the aid of an electric machine 8, which may introduce additional mechanical energy via a mechanical coupling between turbine 61, compressor 62, and electric machine 8, so that compressor 62 may also be operated independently of the mechanical energy provided by the turbine or also in a supporting manner.

The electric support drive may be implemented in different designs. For example, as a media gap motor upstream from compressor wheel 62, or as a mid-engine between the turbine and the compressor wheel.

A charge air cooler 7 may be provided downstream from compressor 62.

The supercharging pressure in charge air section 41 results from the compression output of compressor 62.

Charge air section 41 is restricted downstream by a throttle valve 9. An intake manifold section 42 of air supply system 4 is located between throttle valve 9 and the inlet valves (not shown) of cylinders 23 of internal combustion engine 22. A pressure $p_{20}$ and a temperature $T_{20}$ may be preferably modelled between compressor wheel 62 and charge air cooler 7. The model for modelling is preferably ascertained on an engine control unit 100.

Furthermore, a pressure $p_{21}$ and a temperature $T_{21}$ may be ascertained between charge air cooler 7 and throttle valve 9 with the aid of the model computed on engine control unit 100.

Engine control unit 100 is provided so as to operate internal combustion engine 22 in a manner known per se by actuating the actuator, such as for example throttle valve 9, a supercharger actuator at turbine 61, and the like, according to an instantaneous operating state of internal combustion engine 22 and according to a predefined input, for example a driver input torque. Furthermore, a control unit 110 may be present that preferably assumes the control of electrically supported exhaust gas turbocharger 6. This control unit 110 mainly processes parameters that relate to electrically supported exhaust gas turbocharger 6, such as for example instantaneous rotational speed $n_{sens}$, the instantaneous torque information $M_{trb,act}$, a torque information $M_{trb,maxboost}$ regarding how much torque is available at the instantaneous operation point for a supporting operation via electric machine 8 as well as a torque information $M_{trb,maxrekup}$ regarding how much torque may be received at the instantaneous operating point for a recuperative operation via electric machine 8. Control parameters, such as precontrol values for electric machine 8 and regulation parameters for the supporting and recuperative operation of the electric machine, are transferred from engine control unit 100 to control unit 110, for example. In this case, control unit 110 exchanges its data, for example via a CAN bus, with engine control unit 100. This connection preferably takes place in a wired or wireless manner.

Downstream from engine 22, i.e., on exhaust gas side 5 of motor vehicle 1, a temperature $T_3$, a pressure $p_3$, and an exhaust gas mass flow $\dot{m}_{trb}$ are ascertained between the engine and turbine 61. Furthermore, information about instantaneous turbine power $P_{trb}$ and instantaneous compressor power $P_{cmpr}$ is available.

To ascertain the pressure and the temperature, sensors may be installed or these variables are ascertained with the aid of a model that is computed on control unit 100.

Furthermore, a so-called bypass 63 may be connected in parallel to turbine 61. A valve 64, which is also referred to as a waste gate, is situated in the bypass. If valve 64 is closed, the exhaust gas flow is guided completely through turbine 61. If valve 64 is open, at least a portion of the exhaust gas flow is guided past turbine 61. Furthermore, valve 64 may be set to positions ranging from fully open to fully closed.

In one alternative embodiment of the present invention, an effective flow cross section of the turbine inlet is designed in a variable manner. For this purpose, adjustable guide vanes may be situated in a turbine housing of electrically supported exhaust gas turbocharger 6, in which the turbine wheel is situated, for example. By readjusting the guide vanes, it is possible to change the rotational speed of the turbine wheel while having the same exhaust gas flow, by which the compression generated by the compressor wheel, the so-called supercharging pressure, may be changed. Electrically supported exhaust gas turbocharger 6 having a variable turbine geometry preferably includes a radial turbine and a radial compressor. A guide vane mimic, which is adjusted via an electric actuator, may be present in the turbine inlet. Here, the effective flow cross section upstream from the turbine wheel may be varied by twisting the guide vanes.

In a further variant, an electrically supported turbocharger 6 having a waste gate and a variable valve geometry may also be present.

The described variables may be determined, for example, from sensor values or from variables derived from sensor values or be present as model values. Furthermore, one single sensor may also be installed for each of the described variables. An engine control unit 100 is provided to receive, store and further process the above-named measured variables in the form of models, for example.

Figure 2:
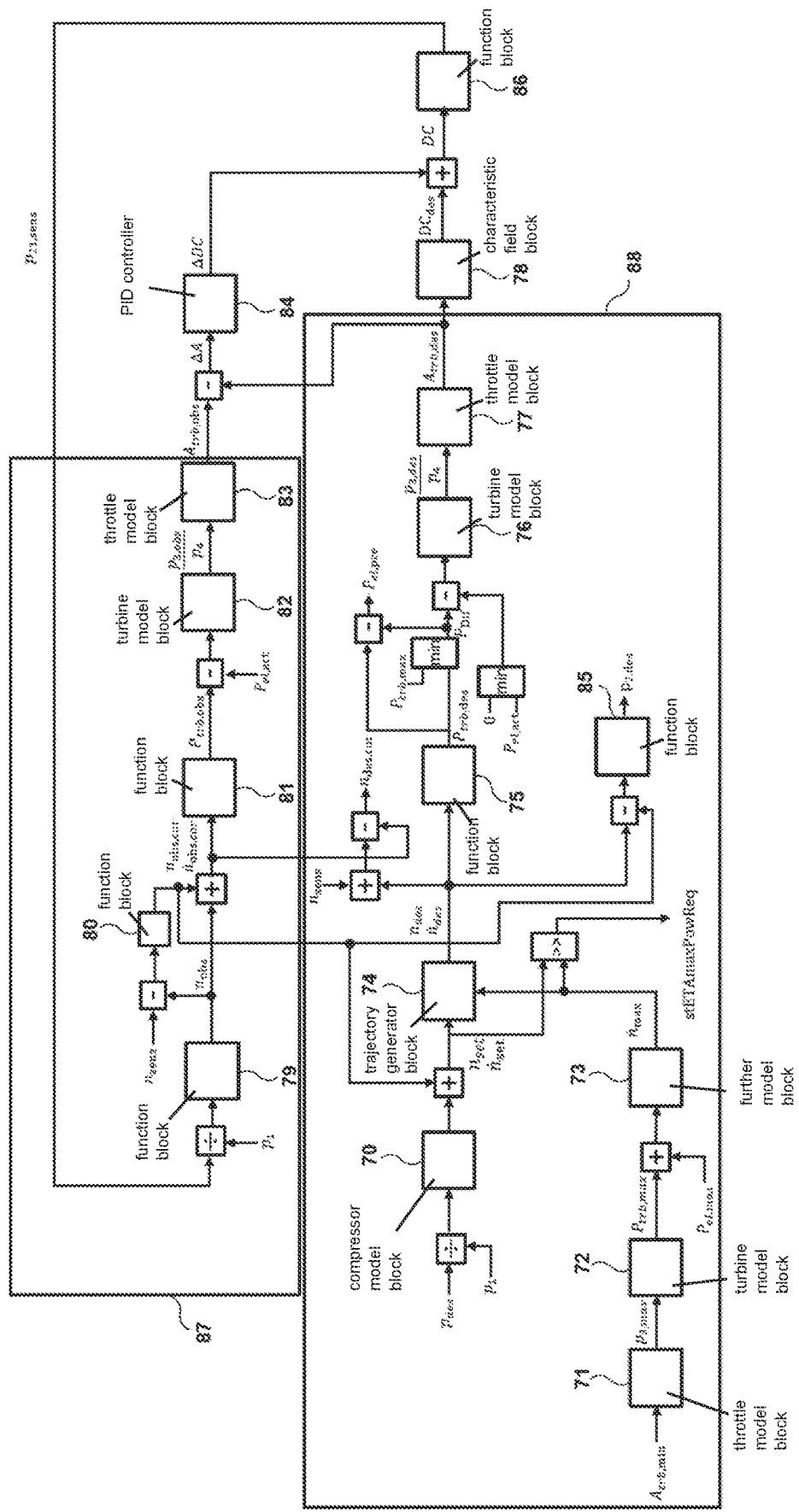
FIG. 2 shows a function diagram for illustrating the method for controlling an electrically supported exhaust gas turbocharger.

A function diagram that includes an observing path 87 and a planned controlling path 88 is illustrated in FIG. 2. In planned controlling path 88, a pressure ratio is converted via compressor 62 in a compressor model block 70. Compressor model block 70 is a compressor characteristic field that is supplied with the ratio of setpoint supercharging pressure $p_{des}$ and pressure $p_1$ upstream from compressor 62.

By using mass flow $\dot{m}_{cmpr}$ via compressor 62, setpoint rotational speed $n_{set}$ of compressor 62 may be ascertained from the compressor characteristic field. In addition, the gradient of setpoint rotational speed set is ascertained on control unit 100.

By using minimally admissible effective turbine area $A_{trb,min}$, a maximally possible exhaust gas back pressure $p_3$,max is ascertained with the aid of a throttle model block 71. Minimally admissible effective area $A_{trb,min}$ may be ascertained with the aid of a test-rig measurement for electrically supported exhaust gas turbocharger 6, for example.

By using temperature $T_3$ and exhaust gas enthalpy S, a maximally possible turbine power $P_{trb,max}$ is ascertained in a turbine model block 72 with the aid of maximally admissible exhaust gas back pressure $p_{3,max}$.

Maximally available electrical driving power $P_{el,max}$ is then added to maximally possible turbine power $P_{trb,max}$. Maximally available electrical driving power $P_{el,max}$ is in this case a dynamic power, since the power of electric machine 8 is a function of the temperature and of the state of charge of the battery of vehicle 1, among other things.

This difference is used to ascertain maximally possible rotational speed gradient $\dot{n}_{max}$ with the aid of a further model block 73. In model block 73, maximally possible rotational speed gradient $\dot{n}_{max}$ is ascertained as a function of the driving power, which corresponds to the sum of the turbine and electrical power, as well as the compressor power and the friction power. For electrically supported systems, this is the pick-up point to take into consideration maximally available electrical power $P_{el,max}$ when determining the maximally possible change in the rotational speed of electrically supported exhaust gas turbocharger 6.

In one special specific embodiment, a full load bit is transmitted from engine control unit 100 to control unit 110 of electrically supported exhaust gas turbocharger 6, when the gradient of setpoint rotational speed $\dot{n}_{set}$ is much greater than the gradient of maximal rotational speed $\dot{n}_{max}$, a full support of electric machine 8 being requested and adjusted. Much greater may be understood to mean, for example, that the gradient of setpoint rotational speed $\dot{n}_{set}$ exceeds the gradient of maximal rotational speed $\dot{n}_{max}$ by at least 15%.

In a trajectory generator block 74, planned rotational speed $n_{des}$ as well as its gradient $\dot{n}_{des}$ is ascertained with the aid of the input variables of setpoint rotational speed $n_{set}$, of the gradient of setpoint rotational speed $\dot{n}_{set}$, and of maximally possible rotational speed gradient $\dot{n}_{max}$. Dynamic predefined setpoint rotational speed $n_{set}$ is restricted to a planned rotational speed $n_{des}$, which may be physically achieved by the given system at the instantaneous operating point, with the aid of this planned trajectory. In this case, planned rotational speed $n_{des}$ does not have to be congruent with setpoint rotational speed $n_{set}$, since the dynamic of predefined setpoint supercharging pressure $p_{des}$ may in fact be greater than illustratable by the system. Furthermore, component protection limits, such as for example rotational speed limits, temperature limits downstream from the compressor, pump characteristics of the compressor, maximal exhaust gas back pressures for the trajectory, may be taken into consideration, when planning the trajectory.

A power balance between the compressor side and the turbine side of electrically supported exhaust gas turbocharger 6 may be established with the aid of planned rotational speed $n_{des}$ and its ascertained gradient $\dot{n}_{des}$, in order to ascertain planned turbine power $P_{trb,des}$ that is necessary for achieving the planned supercharging pressure. This is carried out in a function block 75 as a function of the driving power, which corresponds to the sum of the turbine and electrical power of electrically supported exhaust gas turbocharger 6, as well as the compressor power and the friction power. Moreover, the planned charger rotational speed is usually supplied to control unit 110 of the electrically supported turbocharger as the setpoint value.

Subsequently, planned turbine power $P_{trb,des}$ is restricted to maximally possible turbine power $P_{trb,max}$. Power $P_{Dif}$ resulting therefrom is subtracted from planned turbine power $P_{trb,des}$ and forms a planned precontrol value $P_{el,pre}$ for the driving power of electric machine 8. This precontrol value is supplied to controller 92 in control unit 110 of electrically supported exhaust gas turbocharger 6, which is described in greater detail in FIG. 3.

This planned precontrol value $P_{el,pre}$ is preferably ascertained in engine control unit 100 and transmitted to control unit 110 of electrically supported exhaust gas turbocharger 6 and received by same. In the case of active electrical support by electric machine 8, planned turbine power $P_{trb,des}$ thus corresponds to maximally admissible turbine power $P_{trb,max}$.

The restricted planned turbine power is used as the input variable for turbine model block 76. The result is the pressure ratio between planned exhaust gas back pressure $p_{3,des}$ and pressure $p_4$ downstream from turbine 61.

This pressure ratio is used as the input variable for throttle model block 77 and planned effective turbine area $A_{trb,des}$ is ascertained. As long as the component protection for maximally admissible exhaust gas back pressure $p_{3,max}$ is not active, the remaining computation string yields minimal turbine power $A_{trb,min}$ as planned effective turbine area $A_{trb,des}$.

This planned effective turbine area $A_{trb,des}$ is converted to a duty factor for the actuator in a characteristic field block 78.

On observing path 87, starting from function block 79, modelled observed rotational speed $n_{obs}$ is ascertained together with the input variables of pressure $p_{21,sens}$ and pressure $p_1$. Function block 79 corresponds to compressor characteristics or compressor model in this case.

A planned corrected rotational speed $n_{obs,cor}$ as well as the gradient of planned corrected rotational speed $\dot{n}_{obs,cor}$ of electrically supported exhaust gas turbocharger 6 is subsequently ascertained. For this purpose, a difference between instantaneously ascertained rotational speed $n_{sens}$ and modelled rotational speed $n_{obs}$ is initially ascertained. This difference is processed with the aid of a function block 80 that is designed as a PT1 filter and additionally carries out a maximal and minimal limit. The maximal and minimal limits prevent inadmissible deviations from being included in the computation in the observing structure. This difference corresponds to the error of compressor model 70 or 79. The system variable thus obtained is subsequently added to modelled rotational speed $n_{obs}$ and a modelled corrected rotational speed $n_{obs,cor}$ is ascertained. Furthermore, this correction is also included in the computation when ascertaining setpoint rotational speed $n_{set}$.

Furthermore, a planned corrected charger rotational speed $n_{des,cor}$ is ascertained from the difference between instantaneous charger rotational speed $n_{sens}$ and corrected modelled charger rotational speed $n_{obs,cor}$. This variable is used as the input variable for controlling electrically supported exhaust gas turbocharger 6. This control is advantageously carried out on control unit 110 and described in FIG. 3.

To ascertain planned pressure $p_{2,des}$, a difference between planned rotational speed $n_{des}$ and the instantaneously ascertained rotational speed $n_{sens}$ is formed. Subsequently, this ascertained variable is provided to function block 85 and planned pressure $p_{2,des}$ is obtained. This planned pressure $p_{2,des}$ is adjusted. If the latter is below the setpoint supercharging pressure due to component protection limits or physical limits, such as for example the minimal effective turbine area or excessively little electrical support by electric machine 8, this may be used for a diagnostic function. In the case of multi-stage systems, the pressure ratio for the next compressor stage is computed from planned supercharging pressure $p_{2,des}$.

With the aid of function block 81, observed turbine power $P_{trb,obs}$ is ascertained from modelled corrected rotational speed $n_{obs,cor}$ as well as the gradient of modelled corrected rotational speed $\dot{n}_{obs,cor}$. Modelled turbine power $P_{trb,obs}$ resulting from corrected modelled rotational speed $n_{obs}$ is formed from the electrical power of electric machine 8 and modelled turbine power $P_{trb,obs}$. Instantaneous electrical power $P_{el,act}$ is therefore subtracted from modelled turbine power $P_{trb,obs}$. This difference power is then made available to a turbine model block 82 and a pressure ratio is ascertained between modelled exhaust gas back pressure $p_{3,obs}$ and pressure $p_4$ downstream from turbine 61. This pressure ratio is converted to an effective modelled turbine area $A_{trb,obs}$ with the aid of throttle model block 83. Subsequently, the difference between modelled effective turbine area $A_{trb,obs}$ and effective planned turbine area $A_{trb,des}$ is ascertained. This difference ΔA is subsequently made available to PID controller 84 and a difference duty factor ΔDC is obtained.

Difference duty factor ΔDC is added to ascertained planned duty factor $DC_{des}$ and output to the actuator. By changing the actuator, for example waste gate valve 64 or the variable turbine geometry of electrically supported exhaust gas turbocharger 6. Subsequently, measured pressure $p_{21,sens}$ in function block 86 is transferred back to the observing control block.

The electrical support portion of the entire turbine power may be controlled by restricting maximally admissible exhaust gas back pressure $p_{3,max}$. In this way, the supercharging pressure and the exhaust gas back pressure may be adjusted independently from one another for the very first time, as long as the electrical system is capable of making available the necessary electrical driving power.

Figure 3:
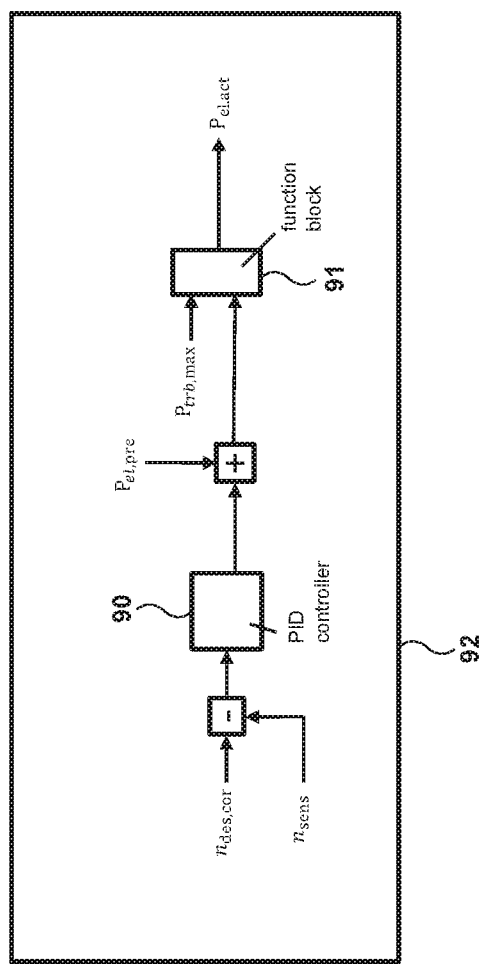
FIG. 3 shows a function diagram for illustrating a rotational speed and power control for electrically supported exhaust gas turbocharger 6.

FIG. 3 shows a function diagram, in which a coordinator 92 is illustrated for electrically supported exhaust gas turbocharger 6 for controlling purposes. For a supported operation (boost mode) of electrically supported exhaust gas turbocharger 6, the strategy is implemented to retrieve the mechanical driving power primarily from exhaust gas turbine 61 until it is restricted, for example, by component protection limits, in particular by maximal exhaust gas back pressure $p_{3,max}$. Only the necessary driving power for the purpose of illustrating setpoint supercharging pressure $p_{des}$ takes place via the electrical portion of electrically supported exhaust gas turbocharger 6.

For this purpose, planned corrected charger rotational speed $n_{des,cor}$ and instantaneous charger rotational speed $n_{des,cor}$ are transferred from observing path 87 and planned controlling path 88 to, and received by, control unit 110 of electrically supported exhaust gas turbocharger 6. Subsequently, a difference Δn is formed between planned corrected charger rotational speed $n_{des,cor}$ and instantaneously ascertained rotational speed $n_{sens}$. Subsequently, difference Δn is made available to a PID controller 90 as an input signal. Electrical power $P_{des,cor}$ is received as an output signal of PID controller 90. Planned precontrol value $P_{el,pre}$ for electric machine 8, which is ascertained in planned controlling path 88, is added to this power $P_{des,cor}$ and overall power $P_{el,ges}$ is obtained. Subsequently, this overall power $P_{el,ges}$ is transferred to function block 91. Function block 91 is a switch, maximally possible power $P_{max}$ or the overall power $P_{el,ges}$ being transferred as an output signal as a function of full load bit stETAmaxPowReq ascertained in planned controlling path 88. If full load power stETAmaxPowReq has the value zero, ascertained overall power request $P_{el,ges}$ is transferred from function block 91 to the final power stage of electrically supported exhaust gas turbocharger 6. If full load bit stETAmaxPowReg transfers value 1, i.e., if the gradient of setpoint rotational speed $\dot{n}_{set}$ is much greater than the gradient of maximal rotational speed $\dot{n}_{max}$, maximal power request $P_{max}$ is transferred to the final power stage of electrically supported exhaust gas turbocharger 6.

Alternatively, the torque for electrically supported exhaust gas turbocharger 6 may also be used as an output variable of PID controller 90 for the coordinator instead of the turbine power.

For the recuperative operation of electrically supported exhaust gas turbocharger 6, the difference between the planned power of the compressor for implementing instantaneous setpoint supercharging pressure $p_{2,des}$ and maximally possible driving power $P_{trb,max}$ of exhaust gas turbine 61 is formed in the case of a closed waste gate valve 64 taking into consideration the component limits, in particular maximal exhaust gas back pressure $p_{3,max}$. This excess power represents maximally possible recuperative power $P_{rek,max}$ for obtaining electrical energy that may still be retrieved from the system when implementing setpoint supercharging pressure $p_{2,des}$. The recuperation may be requested, for example, if $P_{rek,max}$ exceeds a positive minimal value or if the electrical system or the battery network of the system is still capable of receiving this energy in the car battery or for other consumers. The recuperation request is otherwise not approved. Furthermore, the requested recuperative power is restricted to a fraction of recuperation power $P_{rek,max}$ that is maximally possible from electrically supported exhaust gas turbocharger 6, for example 858. The recuperation request preferably may be sent from engine control unit 100 to control unit 110 of electrically supported exhaust gas turbocharger 6 via a status bit.

What is claimed is:

1. A method for controlling an electrically supported exhaust gas turbocharger, comprising the following steps:
    ascertaining a monitored effective turbine area in a monitoring path for the electrically supported exhaust gas turbocharger;
    ascertaining a planned effective turbine area in a planned controlling path;
    ascertaining a correction signal for the electrically supported exhaust gas turbocharger as a function of a difference between the planned effective turbine area and the monitored effective turbine area;
    (i) controlling an actuator as a function of the planned effective turbine area, and/or (ii) activating an electric machine for controlling the electrically supported exhaust gas turbocharger, for a supporting operation corresponding to a boost mode of the electrically supported exhaust gas turbocharger;
    taking a mechanical driving power from an exhaust gas turbine until the taking of the mechanical driving power is restricted by component protection limits;
    for a recuperative operation of the electrically supported exhaust gas turbocharger, determining a difference between a maximally possible turbine power and a planned compressor power by taking into account the component protection limits;
    restricting a maximally possible extracted recuperative power for obtaining electrical energy to the difference between the maximally possible turbine power and the planned compressor power; and
    ascertaining the maximally possible turbine power as a function of a minimal turbine area and/or an exhaust gas back pressure and/or an exhaust gas mass flow.

2. The method as recited in claim 1, wherein a maximally possible rotational speed gradient is ascertained as a function of a minimally effective turbine area and/or an exhaust gas temperature and/or an exhaust gas mass flow, and as a function of a maximally available electrical power of the electric machine.

3. The method as recited in claim 1, wherein a planned turbine power is restricted to the maximally possible turbine power.

4. The method as recited in claim 1, wherein a waste gate valve and/or a variable turbine geometry of the electrically supported exhaust gas turbocharger is used as the actuator.

5. The method as recited in claim 1, wherein a supporting operation of the electrically supported exhaust gas turbocharger is requested when a planned turbine power exceeds a maximally possible turbine power.

6. The method as recited in claim 1, wherein a maximally possible recuperative power is recuperated completely or only partially as a function of a weighting factor of 85%, and/or as a function of a pumping avoidance of the electrically supported exhaust gas turbocharger, and/or as a function of a gear change of a motor vehicle and/or as a function of a battery state of the motor vehicle.

7. The method as recited in claim 1, wherein a maximally possible recuperative power is recuperated completely or only partially as a function of a weighting factor.

8. A method for controlling an electrically supported exhaust gas turbocharger, comprising the following steps: ascertaining a monitored effective turbine area of a turbine in a monitoring path for the electrically supported exhaust gas turbocharger; ascertaining a planned effective turbine area in a planned controlling path; ascertaining a correction signal for the electrically supported exhaust gas turbocharger as a function of a difference between the planned effective turbine area and the monitored effective turbine area; and (i) controlling an actuator as a function of the planned effective turbine area, and (ii) activating an electric machine for controlling the electrically supported exhaust gas turbocharger wherein a maximally possible rotational speed gradient is ascertained as a function of a minimally effective turbine area and/or an exhaust gas temperature and/or an exhaust gas mass flow, and as a function of a maximally available electrical power of the electric machine, wherein based on a gradient of a setpoint rotational speed exceeding the maximally possible rotational speed gradient by at least 10%, a supporting operation of the electric machine is carried out for the electrically supported exhaust gas turbocharger and the turbine is set to a minimal turbine area.

9. A method for controlling an electrically supported exhaust gas turbocharger, comprising the following steps:
    ascertaining a monitored effective turbine area in a monitoring path for the electrically supported exhaust gas turbocharger;
    ascertaining a planned effective turbine area in a planned controlling path;
    ascertaining a correction signal for the electrically supported exhaust gas turbocharger as a function of a difference between the planned effective turbine area and the monitored effective turbine area;
    (i) controlling an actuator as a function of the planned effective turbine area, and/or (ii) activating an electric machine for controlling the electrically supported exhaust gas turbocharger, for a supporting operation corresponding to a boost mode of the electrically supported exhaust gas turbocharger;
    taking a mechanical driving power from an exhaust gas turbine until the taking of the mechanical driving power is restricted by component protection limits;
    for a recuperative operation of the electrically supported exhaust gas turbocharger, determining a difference between a maximally possible turbine power and a planned compressor power by taking into account the component protection limits; and restricting an extracted recuperative power to the difference between the maximally possible turbine power and the planned compressor power, wherein a maximally possible rotational speed gradient is ascertained as a function of a minimally effective turbine area and/or an exhaust gas temperature and/or an exhaust gas mass flow, and as a function of a maximally available electrical power of the electric machine, wherein based on a gradient of a setpoint rotational speed exceeding the maximally possible rotational speed gradient, a signal is transmitted from an engine control unit to a control unit of the electrically supported exhaust gas turbocharger and the control unit of the electrically supported exhaust gas turbocharger requests in a coordinator an electrically supporting operation for the electrically supported exhaust gas turbocharger.

10. A device, comprising:
a control unit for controlling an electrically supported exhaust gas turbocharger, the control unit being configured to:
   ascertain a monitored effective turbine area in a monitoring path for the electrically supported exhaust gas turbocharger;
   ascertaining a planned effective turbine area in a planned controlling path;
   ascertaining a correction signal for the electrically supported exhaust gas turbocharger as a function of a difference between the planned effective turbine area and the monitored effective turbine area;
   (i) control an actuator as a function of the planned effective turbine area, and/or
   (ii) activate an electric machine for controlling the electrically supported exhaust gas turbocharger, for a supporting operation corresponding to a boost mode of the electrically supported exhaust gas turbocharger;
   take a mechanical driving power from an exhaust gas turbine until the taking of the mechanical driving power is restricted by component protection limits;
   for a recuperative operation of the electrically supported exhaust gas turbocharger, determine a difference between a maximally possible turbine power and a planned compressor power by taking into account the component protection limits;
   restrict a maximally possible extracted recuperative power for obtaining electrical energy to the difference between the maximally possible turbine power and the planned compressor power; and
   ascertain the maximally possible turbine power as a function of a minimal turbine area and/or an exhaust gas back pressure and/or an exhaust gas mass flow.

* * * * *